United States Patent [19]

Mattei et al.

[11] 3,785,848
[45] Jan. 15, 1974

[54] POLYURETHANE PLASTICIZED TOPCOAT FOR LEATHER AND METHOD

[75] Inventors: Victor Mattei, Cinnaminson, N.J.; Constance A. Lane, Philadelphia, Pa.

[73] Assignee: Rohm and Haas Company, Philadelphia, Pa.

[22] Filed: Sept. 4, 1969

[21] Appl. No.: 855,363

[52] U.S. Cl............ 117/73, 117/72, 117/74, 117/76 R, 117/161 C, 117/161 KP, 260/16
[51] Int. Cl........................ B44d 1/32, C08b 21/08
[58] Field of Search................ 260/16, 31.2, 33.2, 260/33.6, 33.8, 859; 117/142, 76, 73, 161 C, 161 KP, 76 T

[56] References Cited
UNITED STATES PATENTS

| | | | |
|---|---|---|---|
| 2,884,340 | 4/1959 | Loshaek | 260/859 PV |
| 3,269,858 | 8/1966 | Mattei | 117/76 R |
| 3,441,365 | 4/1969 | Lowell et al. | 260/859 R |
| 3,444,266 | 5/1969 | Reischl et al. | 117/161 KP |
| 3,514,307 | 5/1970 | Hallenbeck | 260/859 R |
| 3,574,154 | 4/1971 | Shaw et al. | 260/16 |
| 2,423,823 | 7/1947 | Baker | 260/16 |
| 3,245,827 | 4/1966 | Weber | 260/13 |
| 3,316,189 | 4/1967 | Adams | 260/13 |
| 3,475,356 | 10/1969 | Davis et al. | 260/16 |

FOREIGN PATENTS OR APPLICATIONS

| | | | |
|---|---|---|---|
| 241,744 | 7/1962 | Australia | 260/16 |
| 831,042 | 3/1957 | Great Britain | 260/16 |
| 500,523 | 3/1954 | Canada | 260/16 |

Primary Examiner—William H. Short
Assistant Examiner—Edward Woodberry
Attorney—Robert A. Doherty, George W. F. Simmons and Carl A. Castellan

[57] ABSTRACT

The present invention is concerned with improved coating compositions based on hard polymers, specifically, cellulose acetate butyrate plasticized with diisocyanate-extended polyesters. The diisocyanate-extended polyesters are formed in situ in the coating of the invention, which is a final top coating for the products of the invention. The invention also includes flexible products, such as full grain leather and substitute leather having topcoatings thereon of outstanding flexibility made from these compositions, and methods for their preparation.

6 Claims, No Drawings

POLYURETHANE PLASTICIZED TOPCOAT FOR LEATHER AND METHOD

This application is related to application Ser. No. 743,968, filed July 11, 1968 by Shaw, Tirrill, and Gordon, now Pat. No. 3,574,154.

Coating compositions of plasticized cellulose acetate butyrate have been used for many purposes but those heretofore used have been found deficient in certain properties, for example, being insufficiently flexible (apparently lacking sufficient elastic recovery) when used to coat flexible substrates having thicknesses of one to four millimeters or greater. For instance, when applied to leather or leather substitutes of this order of thickness, whether as a base coat or a topcoat, and the coated article is sharply creased at a 180° angle with the coated side out, and then restored to flat condition, a distinct crease or haze develops along the line of bend, and this is particularly pronounced when the coating is a nonpigmented topcoat over a dark-colored subcoat or subcoats, being in that case manifest as a dull or white streak which may have a width of about 1 to 3 millimeters or even more.

Other deficiencies of conventional plasticizers are known. For instance, the dry cleaning resistance of such coatings is poor because dry cleaning solvents readily extract plasticizers. The wash resistance of such coatings is poor because soap or detergent solutions will extract plasticizers. The permanence of such coatings is poor because of loss of plasticizer through evaporation, weathering cycles, and absorption by or migration to the undercoats or the substrate. Loss of plasticizer in any of these mentioned ways causes the coating to lose flexibility and stretch, and upon flexing and stretching of the substrate, the coating cracks easily. Then too, the amount of plasticizer that can be incorporated into the coating to improve flexibility and stretch is limited to about 50 percent of the total resin plus plasticizer solids. With much greater amounts, the coating takes on the oily or liquid characteristics of the plasticizer. This is undesirable for topcoats because it can create spue problems, tack problems (blocking), loss of wear properties, and loss of esthetic properties. Even within the limits of practical plasticizer levels for such hard polymers, flexibility and stretch properties leave something to be desired. For instance, nitrocellulose resins plasticized within the practical limit level can not be used to coat upholstery leather because of poor flex properties (finish cracks).

In accordance with the present invention, coating compositions comprising, dissolved in a suitable organic solvent or mixtures thereof, (1) a cellulose acetate butyrate, and (2) a plasticizer formed of a polyisocyanate and the polyester in situ in the coating, have been found to overcome one or more of the deficiencies mentioned hereinabove and to be capable of providing protective coats showing improved wear and weather properties over prior compositions of similar hard polymers having conventional plasticizers therein. The compositions of the present invention are characterized also by improved plasticizer permanence properties, improved stretch properties and improved flex properties over prior compositions of similar hard polymers having conventional plasticizers therein.

The compositions are used to prepare finish or topcoatings to full grain leathers or to leather substitutes such as "Corfam." Thus, the composition of the invention is not used to impregnate the grain side or corium minor, this having already been done. The leather substitute or the grain side of the leather treated is substantially impervious to the liquid coating composition of the invention, even though the substrate may "breathe" or allow the penetration of air and other vapors. The topcoats of the invention are applied similarly to such coats as are described in U.S. Pats. Nos. 2,126,321 and 2,884,340. The leather to which the top or finish coating of the invention is applied has previously been treated on the grain side, and the corium minor is permeated through at least a part of its thickness with a cured synthetic polymer in accordance with prior teachings such as may be found in U.S. Pats. Nos. 2,763,577, 3,066,997, and 3,103,447, as well as in Lowell et al. Pat. No. 3,441,365.

More specifically, the coating composition of the present invention comprises an inert volatile organic solvent, a cellulose acetate butyrate, the precursors of the condensation product of, of (1) an organic polyisocyanate and (2) a polyester of a polyol and a dicarboxylic acid.

The cellulose acetate butyrate preferably has 16 to 40 percent of the hydroxyl groups in a glucose unit esterified with butyric acid and from 10 to 30 percent of such hydroxyl groups esterified by acetic acid. In the following specification, this is referred to as a cellulose acetate butyrate containing 16 to 40 percent butyryl and 10 to 30 percent acetyl. For some uses it is preferred that this ester contains 24 to 28 percent butyryl and 19 to 22 percent acetyl. The molecular weight of the cellulose ester should be such that when viscosity is determined on a 20 percent solution in a 90:10 acetone/ethanol mixture at 25° C. on a falling ball viscometer (ASTM D-1343-54T), the viscosity will be in the range from one-half to 5 seconds and preferably from one-half to 3 seconds, using a 5/16-inch steel ball falling through 10 inches in a 1-inch tube. This specification of molecular size of the cellulose acetate butyrate is commonly used in the industry and simply identifies the cellulose acetate butyrate as having a 1/2-second, a 5-second, or an intermediate viscosity. If the butyryl content is too high, it has been found that the compositions are too tacky for certain uses. Thus, in coated articles which must be embossed by the application of heat and pressure after coating, the composition obtained with cellulose acetate butyrate having excessive butyryl content may exhibit poor plate release after embossing. This may be overcome to some extent by the inclusion of conventional lubricants in the formulation. On the other hand, when the butyryl content is too low, the coating has insufficient elasticity and fails to overcome the difficulty mentioned hereinabove when the coating is applied to thick, flexible substrates and then sharply creased. In other uses, as in the cases where no embossing is done, a cellulose, acetate butyrate, having 12–14 percent acetyl and 35–39 percent butyryl, and a degree of substitution of about 2.7 is perfectly satisfactory.

The plasticizer formed in situ is a polyester having a hydroxyl number of at least about 5, an acid number not over about 5, and a molecular weight of from about 500 to about 10,000, extended by reaction with a polyisocyanate preferably in such proportions that the molecular weight of the condensation product obtained is greater than that of the polyester by from about 50 to about 200 percent. The resulting product may be termed a "polyisocyanate-extended polyester" or it may be called a "polyester modified by reaction with a polyisocyanate." Although the linear polyesters, obtained with dicarboxylic acids and diols are preferred, others prepared from polyols such as triols with dicarboxylic acids are useful. Up to about 50 percent of the polyester may be replaced by polyol polyethers or other polyols as described below.

The polyester is suitably obtained from a diol or other polyol having at least two carbon atoms and a dicarboxylic acid having at least four carbon atoms. Examples of the diols that can be used include ethylene glycol, neopentyl glycol, diethylene glycol, propylene glycol, dipropylene glycol, 2,2-bis(4-cyclohexanol) propane, 1,4-butylene glycol, 1,5-pentanediol, trimethylene glycol, 2,2,4,4-tetra($C_1$-$C_4$) alkyl-1,3-cyclobutanediols, 1,3-butylene glycol, 1,2-butylene glycol, 1,4-pentanediol, 1,6-hexamethylenediol, methylpropanediol, pinacol, and 2-ethyl-1,3-butaneiol. Other polyols including pentaerythritol and triols such as glycerol, 1,2,6-hexanetriol, trimethylolethane and trimethylolpropane are also useful. Many of the glycols are obtainable from olefins through oxidation reactions. Mixtures of polyols are useful, as well as are single polyols. Sterically hindered hydroxyls and one or more secondary hydroxyl groups may also be present and are at times preferred, in preparing the polyesters which are useful in the invention.

Typical dicarboxylic acids which are suitable for reaction with the polyols to obtain the polyesters include the following: sebacic, azelaic, suberic, pimelic, adipic, glutaric, succinic, brassilic, thapsic, Japanic, isosebacic, dimethyl adipic, malonic, phthalic, isophthalic, terephthalic, 3-methyl phthalic, 4-methyl phthalic, 3,4-dimethyl phthalic, dimerized linoleic acid, and the like. These may be used individually or in mixtures. Other polyesters prepared from polyols having three or more hydroxyls and hydroxy acids, such as ricinoleic acid, having a single carboxylic group, are useful.

In the preparation of such linear and branched chain polyesters the diol or polyol is used in small excess of the stoichiometric equivalent amount relative to the dicarboxylic acid. The polyol or diol and diacid may be treated in conventional manner by heating at a temperature of 50° C. up to just below the temperature of the boiling point of the diol. An esterification catalyst such as zinc acetate, zinc oxide, and stannous oxide may be employed. The reaction is carried out until the hydroxyl number of the polyester is in the range of about 5 to about 200, preferably below 150, and the acid number is not over 10 but preferably below 5 such as from about 1 to 4.5. Molecular weights of the polyester obtained by this reaction may be from about 500 to about 10,000, preferably 2,000 to 8,000.

Examples of diisocyanates that may be employed to extend the polyesters include one of, or a mixture of, the following: ethylene diisocyanate, trimethylene diisocyanate, tetramethylene diisocyanate, pentamethylene diisocyanate, propylene-1,2-diisocyanate, butylene-1,2-diisocyanate, butylene-1,3-diisocyanate, butylene-2,3-diisocyanate, diisocyanatoethyl adipate, and hexamethylene diisocyanate; alkylidine diisocyanates, such as ethylidene diisocyanate ($CH_3CH(NCO)_2$) and butylidene diisocyanate $CH_3CH_2CH_2CH(NCO)_2$; cycloalkylene diisocyanates such as cyclopentylene-1,2-diisocyanate, cyclohexylene-1,2-diisocyanate, and cyclohexylene-1,4-diisocyanate; aromatic diisocyanates such as m-phenylene diisocyanate, p-phenylene diisocyanate, 1-methyl-phenylene-2,4-diisocyanate, 2,4-tolylene diisocyanate, naphthalene-1,4-diisocyanate, 0,0'-toluenediisocyanate, xylylene-1,4-diisocyanate, xylylene-1,3-diisocyanate, 1,5-naphthalene diisocyanate, 4,4'-diphenylenemethane diisocyanate, and 4,4'-diphenylenepropane diisocyanate, p-phenylenediisocyanate, o-phenylenediisocyanate, 1,6-hexamethylene diisocyanate, methylene-bis(4-phenylisocyanate), 1-chloro-2,4-phenylenediisocyanate, diphenyl-3,3'-dimethyl-4,4-diisocyanate, 3,3'-dimethoxy-4,4'-biphenyl diisocyanate, diphenyl-1,3'-dimethoxy-4,4'-diisocyanate, 1,3-phenylenediisocyanate, 4,4'-biphenyl diisocyanate, p-dixylyl methane-4,4'-diisocyanate. The proportion of polyisocyanate employed is sufficient to react with the hydroxyl groups of the linear polyester.

While the diisocyanate per se may be used, it is preferred to prepare a prepolymer in known manner containing at least two terminal isocyanate groups, and to utilize such prepolymer in forming the coating according to the invention. Such known prepolymers are prepared by reacting excess polyisocyanate with either the polyester or with a polyol in known manner. Similarly, conventional adducts of polyisocyanates and hydroxyl compounds such as trimethylol propane, hexanetriol, and the like reacted at a 1:2 NCO/OH ratio, or such adducts reacted as is known with phenol, aromatic amines and the like to form blocked adducts, are useful. As used herein, the term "polyisocyanate" is to be interpreted as including diisocyanates and the like, prepolymers, and the adducts and blocked isocyanates.

The relative amounts of polyisocyanate and branched or linear polyester are preferably selected to assure that the condensation product has a molecular weight in the range specified above. Thus, depending on the molecular weight of the polyester starting material more or less of the polyisocyanate may be used. The plasticizer is used in an amount of 5 to 400 parts by weight per hundred parts by weight of cellulose acetate butyrate.

The cellulose acetate butyrate, and the plasticizer precursors are dissolved in a suitable inert solvent to provide a concentration suitable for coating purposes which may vary from 1 to 30 percent or more depending on the particular substrate to which the composition is to be applied and the manner in which it is to be applied. They may be applied as the solution, or the solutions may be used in a water-in-oil emulsion. Although useful procedure is to pre-react the diisocyanate, an adduct thereof with a triol, a phenol-blocked adduct, or a diisocyanate prepolymer having terminal isocyanate groups with the polyester prior to combining the same with the hard polymer to form the coating composition, the polyisocyanate and the polyester can be reacted in situ in the topcoating of the invention, in the presence of the hard polymer.

Application of the coating composition may be by spraying, brushing, transfer rolls, dipping or any other conventional coating equipment. One or more coats may be applied as desired. The thickness of the coating may vary depending upon the particular purposes that it is intended that the coating should serve. When a clear coating is applied in a single application, the weight of deposit may be from 0.03 to 1.0 oz. per square yard. When it is desired to apply a heavier coating in the range specified, it is generally desirable to employ several application steps with drying in between.

The coating composition may be clear or it may be provided with slip agents, fillers, pigments, or dyes depending upon the particular use desired. The purpose of these additives may be to color the coating or to deluster it. Examples of the pigments include clay, titanium dioxide, calcium carbonate, blancfixe, finely divided metals such as aluminum, color lakes and tinctorial oxides. Other conventional additives commonly used include lubricants, heat stabilizers, antioxidants, ultraviolet stabilizers, flame retardants, and dulling agents to soften the gloss. Suitable slip agents include silicones, waxes, and synthetic waxes.

The solvents that may be used include ketones, esters, hydrocarbons and chlorinated hydrocarbons. Examples of ketones include acetone, methyl ethyl ketone, methyl isopropyl ketone, diisobutyl ketone, methyl isobutyl ketone and ethyl isopropyl ketone. Examples of ethers include dioxane, diethyl ether, tetrahydrofuran and diixopropyl ether. Examples of esters include ethyl acetate, isopropyl acetate, butyl acetate, 2-ethoxyethyl acetate, 2-butoxyethyl acetate, ethyl propionate, and methyl butyrate. Examples of hydrocarbons include benzene, toluene, xylenes; petroleum and solvent naphthas of aromatic character and mixtures of these aromatics with aliphatic such as octane and decane. Chlorinated hydrocarbons include chloride, ethylene dichloride, perchloroethylene, chloroform, bromoform, and carbon tetrachloride.

The particular solvent may be composed of a single solvent material or it may be composed of a mixture of any of the materials mentioned hereinabove.

The coating composition of the present invention may be employed to apply decorative and/or protective coatings to all sorts of substrates including paper, wood, leather, leather substitutes, textiles, plastic films such as polyethylene, polypropylene, polyethylene terephthalate, rigid and flexible foams, nylon, metal foils such as aluminum, or laminated structures comprising layers of the various materials mentioned.

The pigmented compositions may be employed for the mineral coating of paper for which purpose there may be employed 8 to 12 parts of plasticized hard polymer per 100 parts by weight of the pigment which may be clay or titanium dioxide or mixtures thereof. Pigmented compositions may be employed for the pigment dyeing of textiles or for the base-coating of porous substrates in general including textiles, leather, leather substitutes, and paper. In such systems the amount of plasticized hard polymer may be from 80 to 500 percent by weight based on the weight of the pigment in the composition. The solids content of a clear lacquer film of the composition that is applied for these purposes is generally in the range of 0.03 to 0.07 oz. per square yard.

Either the clear or pigmented compositions of the present invention may be applied for rendering leather, textile fabrics, paper and other hydrophilic systems resistant to water while not preventing water vapor transmission. Such compositions are, therefore, useful in the production of rainwear and they are also useful for the finishing of leather and substitute leathers.

The pigmented compositions may be employed for the base-coating of leather and leather substitutes whereas the clear solutions of the present invention are quite useful as topcoatings over such pigmented basecoats or over other base-coats.

The special advantage of the compositions of the present invention is that they deposit a coating which in the dry condition has outstanding elastic recovery and flexibility and yet are tough so that they can be used as wear layers when applied to leathers or substitute leathers in upholstery, and in garments such as shoes, jackets, and so forth. These characteristics of flexibility and outstanding elastic recovery make the coating compositions extremely valuable in the coating of thick flexible substrates, and particularly those having a thickness of 30 mils to 100 mils or higher, which are subjected to severe bending action, for example in the coating of leather or substitute leathers and particularly Corfam (registered trademark) used in upholstery, shoes and other garments.

The top coating of the invention is applied to leather which has been tanned, fatliquored, buffed or not, impregnated with resins or not, but in all cases which has been finished with an undercoating.

Unless otherwise stated, all parts and proportions are by weight.

Example 1

Leather, previously coated, is topcoated with a mixture of 3 parts of 3 second cellulose acetate butyrate (25 percent butyryl, 20 percent acetyl), 6 parts lightly branched polydiethylene-neopentyl adipate condensed to a hydroxyl number of about 55, an acid number of below 2.0 and having a molecular weight of about 2,000, 2 parts of Desmodur N (a biuret polyisocyanate prepared from hexamethylene diisocyanate and having a NCO content of about 16 percent), 0.015 parts of tin dibutyl laurate, 41 parts of toluene, and 50 parts of methyl isobutyl ketone and blended together and the composition is applied as a top coat on black leather. After curing for 60 seconds or longer at 170° F., the wear, weathering, plasticizer permanence, tack, stretch, flex and toughness properties are much improved as compared to the use of 3 parts of 3 seconds cellulose acetate butyrate (25 percent butyryl, 20 percent acetyl) plasticized with 6 parts of a conventional plasticizer. The ratio of the ultimate reaction product of Desmodur N and the polydiethyleneneopentyl adipate to give the plasticizer of the invention to the amount of cellulose acetate butyrate is 266.6 parts of plasticizer per 100 parts of the cellulose ester.

Example 2

Similar results are obtained using, as the polyester, 1,3-butylene adipate having about the same molecular weight, hydroxyl number and acid number.

Example 3

Example 2 is repeated but using 6 parts of castor oil in place of the polyester and using 6 parts of "Desmodur N." The plasticizer obtained from the ultimate coating on the Desmodur N and the castor oil amounts to 400 parts of plasticizer to 100 parts of cellulose ester.

Example 4

Example 3 is repeated but chemically polymerized castor oil having a hydroxyl number of 110, and 4 parts of Desmodur N is used.

Example 5

Example 1 is repeated using, in place of Desmodur N, two parts by weight of a polyisocyanate made from trimethylol pro-pane and 2,4-tolylene diisocyanate reacted at an NCO/OH ratio of about 2/1 and having an NCO content of about 14 percent, to give excellent results.

Example 6

Example 1 is repeated using 5 parts of the cellulose acetate butyrate, 3 parts of the polyester and one part of Desmodur N. The ratio of polyester-Desmodur N reaction product to cellulose ester is 80 to 100 parts by weight.

Example 7

A microporous gas-permeable synthetic leather comprising a sheet of urethane polymer reinforced with polyester is coated with the compositions of Examples 1-9, which are then cured in a similar manner, with good results.

We claim:

1. In a method of providing a top coating on leather or porous artificial leather having an undercoating, the steps of applying a coating thereto of a composition containing (1) an inert organic solvent, (2) cellulose acetate butyrate having 16 to 40 percent butyryl and 10 to 30 percent acetyl and a viscosity within the range of from one-half to 5 seconds, (3) a polyester, the hydroxyl number of the polyester being from 5 to 200 and the acid number being below 10, the molecular weight thereof being from 500 to about 10,000, and (4) a material containing at least two terminal isocyanate groups selected from a diisocyanate, adducts with triols, and blocked adducts thereof, the isocyanate being used in excess of the polyester, and curing the coating, whereby the reaction product of the isocyanate material and the polyester obtained in situ in the coating serves to plasticize the coating, the ratio of plasticizer to cellulose acetate butyrate being from 5 parts to 400 parts per 100 parts of cellulose ester.

2. The method of claim 1 in which the cellulose ester has 24 to 28 percent butyryl and 19 to 22 percent acetyl.

3. The method of claim 1 in which the polyol of said polyester is one which has a secondary hydroxyl group or a stearically hindered hydroxyl group.

4. The method of claim 2 in which the polyol of said polyester is one which has a secondary hydroxyl group or a stearically hindered hydroxyl group.

5. Leather or porous artificial leather prepared in accordance with the method of claim 1.

6. Leather or porous artificial leather prepared in accordance with the method of claim 2.

* * * * *

UNITED STATES PATENT OFFICE
CERTIFICATE OF CORRECTION

Patent No   3,785,848   Dated   Janurary 15, 1974

Inventor(s)   Victor Mattei, Constance A. Lane

It is certified that error appears in the above-identified patent and that said Letters Patent are hereby corrected as shown below:

Column 3, line 18 – "butaneiol" should be --butanediol--.

Column 4, line 50 – "Although useful" should read -- Although a useful--.

Column 5, line 21 – "diixopropyl" should be --diisopropyl--.

Column 5, line 28 – insert "methylene" before "chloride".

Column 6, line 37 – "and" should be ----are---.

Signed and sealed this 23rd day of July 1974.

(SEAL)
Attest:

McCOY M. GIBSON, JR.
Attesting Officer

C. MARSHALL DANN
Commissioner of Patents